United States Patent
McCool et al.

[11] Patent Number: 6,106,644
[45] Date of Patent: Aug. 22, 2000

[54] APPLICATION OF STOP-OFF MATERIAL, PARTICULARLY FOR USE IN DIFFUSION BONDING AND SUPERPLASTIC FORMING

[75] Inventors: Allister McCool; Nigel D Haworth, both of Balderstone, United Kingdom

[73] Assignee: British Aerospace Public Limited Company, Farnborough, United Kingdom

[21] Appl. No.: 08/992,102

[22] Filed: Dec. 17, 1997

[30] Foreign Application Priority Data

Dec. 18, 1996 [GB] United Kingdom ............ 9626230

[51] Int. Cl.[7] .................. B32B 33/00; B23K 20/18; B41M 1/28; B05B 7/24
[52] U.S. Cl. .......... 156/64; 156/275.1; 156/277; 156/278; 156/280; 156/285; 156/288; 156/289; 156/290; 156/384; 427/383.1; 228/118; 228/193
[58] Field of Search ................ 156/64, 275.1, 156/277, 278, 285, 288, 289, 290, 384, 500, 537, 280; 427/284, 288, 383.1; 228/157, 155, 118, 193

[56] References Cited

U.S. PATENT DOCUMENTS

| | | | |
|---|---|---|---|
| 4,215,353 | 7/1980 | Kaieda et al. | 346/140 R |
| 5,316,203 | 5/1994 | Rowe et al. | 228/118 |
| 5,559,708 | 9/1996 | Turnbull et al. | 364/468.03 |
| 5,827,577 | 10/1998 | Spencer | 427/475 |

FOREIGN PATENT DOCUMENTS 2 187 419   9/1987   United Kingdom .

OTHER PUBLICATIONS

Bassemir et al., "Inks", Kirk–Othmer Encyclopedia of Chemical Technology, 4th. ed. vol. 14. pp. 498–500, 1995.

*Primary Examiner*—Richard Crispin
*Assistant Examiner*—J. A. Lorengo
*Attorney, Agent, or Firm*—Nixon & Vanderhye P.C.

[57] ABSTRACT

A method of applying a pattern of stop-off material to a sheet is described, the pattern being stored in a computer memory; the method comprises:

(a) placing the sheet (22) on a table (12) that is traversable by a printing head (14) capable of applying jets of fluid from a reservoir onto the underlying sheet, (b) supplying a suspension of stop-off material to the fluid jet reservoir and (c) traversing the printer head (14) with respect to the sheet and (d) so controlling the head that it applies jets of stop-off material to the sheet to form a pattern of stop-off material in accordance with the pattern stored in the said memory.

The method finds particular use in applying stop-off material in combined diffusion bonding/superplastic forming fabrication techniques.

7 Claims, 1 Drawing Sheet

APPLICATION OF STOP-OFF MATERIAL, PARTICULARLY FOR USE IN DIFFUSION BONDING AND SUPERPLASTIC FORMING

TECHNICAL FIELD

The present invention relates to the application of stop-off material that prevents bonding during a manufacture of a composite metallic structure, especially using diffusion bonding and superplastic forming techniques (DB/SPF).

BACKGROUND ART

Combined diffusion bonding/superplastic forming DB/SPF is a well established technique for making composite articles from materials that exhibit superplastic properties at elevated temperatures. These materials are primarily titanium, aluminium and alloys of these metals. In established DB/SPF processes, for example see U.S. Pat. No. 5,153,276, it is known to apply stop-off material to selected areas of two or more sheets of superplastic material; several sheets, including the sheets to which the stop-off material has been applied, are then assembled into a pack with the stop-off material lying between adjacent superplastic sheets. The assembled pack is then heated and compressed until the sheets are diffusion bonded together; however, the sheets will not be bonded in the selected areas covered by the stop-off material since the stop-off material prevents the diffusion of metal atoms between adjacent sheets and so prevents diffusion bonding in the selected areas.

The diffusion bonded pack may then be subject to superplastic forming by heating the pack, usually in a closed mould, to a temperature at which the metallic components exhibit superplastic properties. An inert gas is then injected at high pressure in a controlled manner into the unbonded areas of the pack so as to "inflate" the sheets gradually into a three dimensional structure having an outer shape corresponding to the shape of the mould. The unbonded areas of the pack are the selected areas covered by stop-off material during diffusion bonding.

DB/SPF has particular application in the aircraft industry where complicated high strength lightweight structures can be manufactured using this technique.

Known stop-off materials are generally refractory materials, such as yttria, boron nitride, graphite or alumina. Yttria and alumina are the most commonly used stop-off material.

The stop-off material may be applied by various techniques, for example silk screen printing or spraying through a mask. Commercially, stop-off material is applied using silk screen printing.

EP-A 2 006 073 describes a composition that may readily be used to apply stop-off material in DB/SPF techniques.

The manufacture of the silk screen is complex and time consuming. The handling and storage of silk screens is troublesome. The silk screen can become damaged in use. The silk screen does not have a very high resolution and the printing of the stop-off pattern using silk screens can be inaccurate. A brief description of the manufacture of the silk screens and their use in applying stop-off materials will now be given.

In complex aerospace design, computer aided design (CAD) techniques are usually employed. Using such techniques, a required stop-off pattern can be generated within a computer memory. Using this stored pattern data a polymer film (e.g. a Rubylith film) can be cut out for example using computer control cutting techniques. A silk screen mesh is then tensioned and coated with a photosensitive emulsion. The film is then placed over the emulsion and the emulsion is exposed to light. The light hardens the emulsion except in the areas in the shadow of the film. The unexposed emulsion underneath the film is then rinsed off leaving a silk screen that after developing and fixing, is permeable in the areas corresponding to the stop-off pattern but otherwise is impermeable. In order to apply stop-off to a sheet of superplastic material, the silk screen, which is held in tension by an aluminium frame, is placed over the superplastic material and the stop-off composition is applied through the open pores of the silk screen by drawing a squeegee soaked in stop-off material across the silk screen to apply the stop-off material to the underlying superplastic sheet.

It can be seen that the manufacture of a silk screen is time consuming and therefore expensive and also leads to a delay in transferring the design into a manufactured article while the silk screen is being produced. It would be advantageous to reduce or eliminate this time delay. Silk screens are delicate and can easily be damaged by impact with a sharp object. This is particularly true when the silk screens are held in tension on a frame. If damaged, a fresh silk screen must be produced.

The accuracy of the stop-off pattern applied by silk screen printing techniques is limited by the diameter and pitch of the strands of silk, which are usually larger than is desirable. Further inaccuracies can be introduced in the various manufacturing stages required to produce the silk screen.

When a large silk screen is used to apply a large stop-off pattern, the silk can stretch as the stop-off material is applied by drawing the squeegee over the silk screen. This can cause a displacement of the pattern and/or inaccuracies in the shape of the stop-off pattern applied.

Before storing the silk screen, it must be cleaned using solvents and this is time consuming and troublesome.

It is an object of the present invention to provide a simpler technique for applying stop-off material in a predefined pattern.

DISCLOSURE OF THE INVENTION

According to the present invention, there is provided a method of applying a pattern of stop-off material to a sheet of superplastically deformable material, the pattern being stored in a computer memory, comprising the steps of:

(a) storing data defining a pattern to be applied to the sheet in the memory of a computer (b) placing the sheet on a table that is traversable by a printing head under the control of the computer capable of applying jets of fluid from a fluid reservoir onto the underlying sheet, (c) supplying a suspension of stop-off material to the fluid reservoir, and (d) traversing the sheet with the printing head under computer control, the computer being programmed to so control the head that it applies jets of stop-off material to the sheet to form a pattern of stop-off material in accordance with the pattern stored in the said memory.

Heads for producing the jets of fluid are well known from ink jet printing technology and the control of such heads to apply a pattern stored in a computer memory is also a well established technique. The resolution of such printer heads is of the order of 300 to 1,200 dots per inch (120 to 180 dots per centimeter). This is a substantially greater resolution than can be achieved by the silk screen technique of applying stop-off material. Silk screens currently used can achieve a resolution of approximately 62 threads per inch only.

A printing head can be driven by a known flat bed plotter, which can be obtained commercially, for example, from the firm Data Technology of Kongsberg.

The suspension of stop-off material used in our new technique should have a lower viscosity than that of suspensions of stop-off material used in the silk screen technique. This can be achieved by thinning down such known stop-off suspensions using solvent.

E-0 266 073 describes a stop-off composition that contains an anti-settling and anti-coagulant additive and such additives should be included in the suspension of stop-off material used in our new technique.

We have discovered that using the method described above it is possible to apply a stop-off pattern directly to a superplastic sheet from data held within a CAD or CAM (computer aided manufacturing) system using known ink jet technology. This eliminates the need to manufacture silk screens, the lead time necessary for their production, the need for their careful handling and storage and it eliminates the inaccuracies mentioned above in relation to the use of silk screens. Moreover, greater resolution is achievable than with silk screens.

Although the application of stop-off material has been described in connection with DB/SPF, the present invention is not limited to that technique and can be used in other techniques in which stop-off material is applied in a predefined pattern, for example in explosion bonding.

DESCRIPTION OF THE DRAWINGS

The invention will be further described, by way of example only, with reference to the accompanying drawings in which.

DETAILED DESCRIPTION OF THE PREFERRED EMBODIMENT

Figure 1:
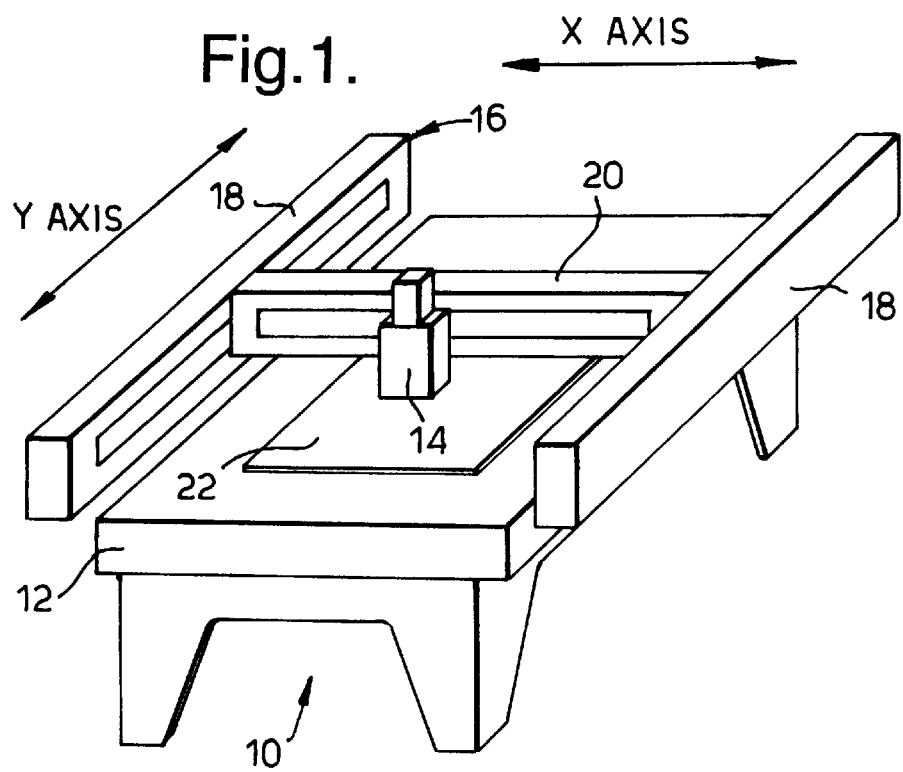
FIG. 1 is a perspective view of an arrangement of a computer controlled printing head.

Referring initially to FIG. 1 of the drawings, there is shown a flat bed plotter 10 of known design having a machine bed 12 and a fluid jet printing head 14 supported on a framework 16 above the machine bed 12. The framework 16 includes a pair of parallel beams 18 supporting a cross beam 20 that can be driven along the parallel beams 18 by a drive (not shown). The printing head 14 call be driven along the cross beam 20 by a separate drive (also not shown). A sheet of superplastically deformable material 22 is accurately located on the machine bed 12, for example using hard stops, tooling holes or pins. Alternatively the sheet 22 may be clamped to the bed using a mechanical or vacuum clamping method.

Figure 2:
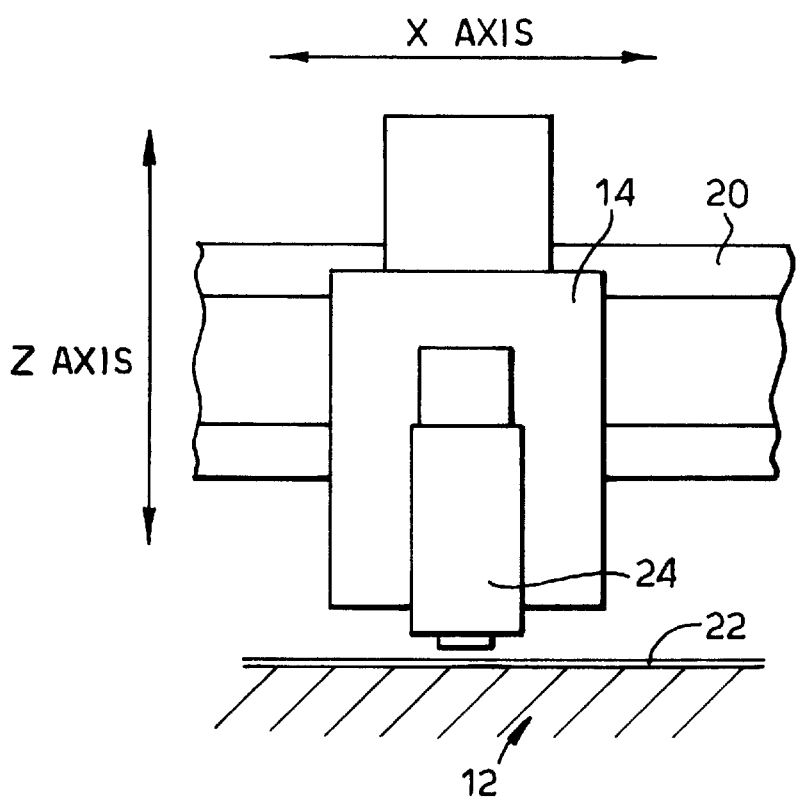
FIG. 2 is a detailed elevation of the printing head of the apparatus shown in FIG. 1.

Referring to FIG. 2, the printing head 14 is shown supported on cross beam 20 above the sheet 22 that is clamped to the machine bed 12. The printing head 14 includes a print cartridge 24 that includes a reservoir (not shown) containing a suspension of stop off material. The printer cartridge 24 is similar to those manufactured for ink jet printers, for example Novajet or Hewlett Packard printers. The printing head 14 is capable of applying the stop-off suspension to the sheet 22 in the form of dots having a resolution of 400 to 1,200 dots per inch.

In order to achieve the required stop-off resolution, the degree to which a jet of stop-off suspension can fan out is limited by passing the printing head very closely over the sheet 22. In order to accommodate different thicknesses of sheet material, the printing head 14 can be moved vertically in the direction of the Z axis with respect to the cross beam 20 (see FIG. 2). This can be achieved by means of a manually adjusted wheel or by an electric motor. In order to prevent damage to the printing head 14 by forgetting to adjust the appropriate height of the printer head above the sheet material, it is preferred that the height of the printing head 14 above the sheet is set automatically by means of a proximity sensor (not shown).

The printing head is traversed over the surface of the sheet 22 under the control of a computer (not shown) which controls electric motors driving the printing head along the X and Y axes as required. In this way, the printing head applies a pattern of stop-off material to the sheet 22 according to data held in a CAD or CAM system installed in the computer.

The CAD or CAM data is generated in one of any number of known computer applications, for example CATIA, ANVIL, or Unigraphics. These can be used, with existing known printer interfaces, to drive the flat bed plotter and the printing head 14.

The suspension of stop-off material is applied as a jet of liquid which dries on the sheet 22 naturally by evaporation of the suspension fluid. If it is desired to accelerate the drying and evaporation process, the sheet 22 may be heated locally, for example, using an infrared heater.

It will be appreciated that the present invention eliminates the requirement to use silk screens and the attendant disadvantages of silk screens discussed above. Thus, data held on a CAD/CAM system can be directly used to drive the plotter and printing head. It is particularly advantageous that the lead time necessary to manufacture silk screens is also eliminated.

Although the application of stop-off material using a silk screen is extremely rapid and generally faster than that can be achieved according to the present invention, the time necessary to set up and clean silk screens means that, generally, the process of the present invention takes less time to apply stop-off to superplastic sheets than the known silk screen printing techniques.

Many variations and modifications of the above techniques will now suggest themselves to those familiar with ink-jet printing techniques and/or DB/SPF techniques.

Naturally, it is possible to keep the position of the head 14 fixed and move the machine bed 12.

Instead of using a flat bed plotter to traverse the printing head over the sheet, the head may be traversed by a converted cartesian robot.

In order to speed up the application of stop-off material, more than one printing head may be used to apply the stop-off material to any one sheet.

What is claimed is:

1. A method of applying a pattern of stop-off material to a sheet of superplastically deformable material, the pattern being stored in a computer memory, comprising the steps of:
    (a) storing data defining a pattern to be applied to the sheet in the memory of a computer;
    (b) placing the sheet on a table that is traversable by a printing head under the control of the computer capable of applying jets of fluid from a fluid reservoir onto the underlying sheet;

(c) supplying a suspension of stop-off material to the fluid reservoir; and, (d) traversing the sheet with the printing head, under computer control, the computer being programmed to so control the head that it applies jets of stop-off material to the sheet to form a pattern of stop-off material in accordance with the pattern stored in the said memory.

2. A method as claimed in claim 1 wherein the printing head producing the jets of stop-off material is an ink jet printing head.

3. A method as claimed in claim 1, wherein the printer head is traversed with respect to the sheet by a flat bed plotter.

4. A method as claimed in claim 1, wherein the suspension of stop-off material has a lower viscosity than suspensions of stop-off material applied by means of silk screen printing.

5. A method as claimed in claim 1, wherein the sheet is subsequently bonded to another sheet in those areas not covered by stop-off material.

6. A method as claimed in claim 5, wherein the bonding step is achieved by diffusion bonding.

7. A method as claimed in claim 5, wherein the bonded sheets are formed into a three-dimensional structure by superplastic forming.

\* \* \* \* \*